(12) United States Patent
Liu

(10) Patent No.: US 10,364,029 B2
(45) Date of Patent: Jul. 30, 2019

(54) DRONE FOR AGRICULTURE

(71) Applicant: Yongbiao Liu, Salinas, CA (US)

(72) Inventor: Yongbiao Liu, Salinas, CA (US)

( * ) Notice: Subject to any disclaimer, the term of this patent is extended or adjusted under 35 U.S.C. 154(b) by 208 days.

(21) Appl. No.: 15/616,926

(22) Filed: Jun. 8, 2017

(65) Prior Publication Data
US 2018/0354624 A1 Dec. 13, 2018

(51) Int. Cl.
| B64D 1/18 | (2006.01) |
| B64C 39/02 | (2006.01) |
| A01C 21/00 | (2006.01) |
| A01C 23/04 | (2006.01) |
| A01M 7/00 | (2006.01) |

(52) U.S. Cl.
CPC .............. *B64D 1/18* (2013.01); *A01C 21/00* (2013.01); *A01C 21/002* (2013.01); *A01C 23/047* (2013.01); *A01M 7/00* (2013.01); *B64C 39/024* (2013.01); *B64C 2201/066* (2013.01); *B64C 2201/12* (2013.01); *B64C 2201/146* (2013.01); *B64C 2201/162* (2013.01)

(58) Field of Classification Search
CPC ......... A01C 21/00; A01M 7/00; A01M 7/005; A01M 7/0053; A01M 7/0057; B64D 1/00; B64D 1/16; B64D 1/18; B64D 1/20
USPC .................. 239/427; 244/17.11, 17.23, 17.25
See application file for complete search history.

(56) References Cited

U.S. PATENT DOCUMENTS

| 8,453,962 B2 * | 6/2013 | Shaw ..................... B64C 27/20 244/12.4 |
| 9,051,050 B2 * | 6/2015 | Achtelik ................. B64C 27/08 |
| 2012/0298793 A1 * | 11/2012 | Weddendorf ............. F03D 5/00 244/17.23 |
| 2017/0129605 A1 * | 5/2017 | Wu ........................... A01M 7/00 |
| 2018/0093284 A1 * | 4/2018 | Harris .................... B64C 1/061 |
| 2018/0133741 A1 * | 5/2018 | Dong ...................... B64D 1/16 |

FOREIGN PATENT DOCUMENTS

| CN | 102923306 | * | 2/2013 | |
| CN | 106043702 | * | 10/2016 | |
| CN | 205891245 | * | 1/2017 | |
| CN | 107839886 | * | 3/2018 | |
| CN | 108082491 | * | 5/2018 | |
| CN | 108402019 | * | 8/2018 | |
| CN | 109050924 | * | 12/2018 | |
| DE | 102015220802 A1 | * | 4/2017 | ............... B64D 1/16 |
| KR | 2017126274 | * | 11/2017 | |
| KR | 1885517 | * | 8/2018 | |

* cited by examiner

Primary Examiner — Joshua E Rodden

(57) ABSTRACT

A drone for spraying liquid over field crop includes: a frame with a slender rigid beam in the middle and two base structures at the two ends, a rigid tube with an array of nozzles on elongated stems and the rigid tube is suspended below the beam structure with retractable wires, at least three propellers on motors with arms that are rotatably mounted to each of the two base structures of the frame, a power source, at least one distance detector for measuring height, an antenna for communication, an electronic control system to operate motors and sensors, a container for a liquid material and electronic valve to allow liquid in the container to be transferred and sprayed from the nozzles, and a remote controller. The drone is intended to spray liquid over a wide strip of the field with high efficiency, precision, and safety and reduced drift of sprays.

9 Claims, 7 Drawing Sheets

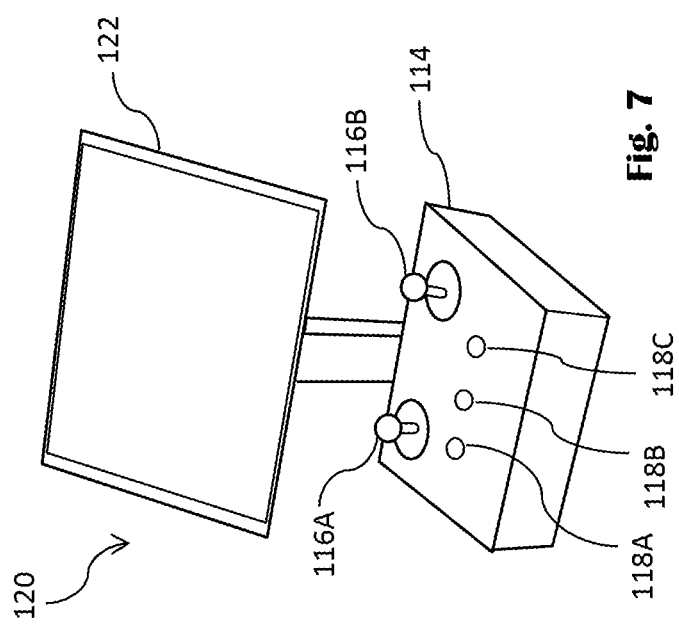

DRONE FOR AGRICULTURE

BACKGROUND OF THE INVENTION

1. Field of the Invention

The present invention relates to a drone for plant protection and production; and more particularly the present invention relates to a drone used for applying pesticides, fungicides, herbicides, plant growth regulators, defoliation agents, fertilizers, and other agents over field crops.

2. Description of the Related Art

Drones become popular in recent years and have potential to be used in agriculture. However, most civilian applications concentrate in aerial photographs, surveillance, inspection, and package delivery. Use of drones for spraying pesticides or other chemical agents is very limited. Most prior arts on drones for pesticide spray are based on general purpose drones with added capabilities to spray pesticides. The current invention is a specialized drone that can have high efficiency and precision in spraying pesticides or other chemical agents for crop protection and production while it is also safe to operate and has advantages of reduced drift of sprays.

SUMMARY OF THE INVENTION

Drones have great potential in applications of spraying pesticides, fungicides, herbicides, plant growth regulators, defoliation agents, and fertilizers to increase efficiency and reduce costs as compared with traditional application methods. Using drones to spray toxic agents such as pesticides also reduce health risks associated with pesticide exposures by workers. For aerial pesticide spray, it is important to spray at a height close to crop canopy to reduce drift and increase precision. However, to operate a drone at a low altitude may increase the difficult levels for operation skills and increases the risk of crush. At a low altitude, a drone could also get entangled with tall plants or other objects such as sprinklers. Also at a low altitude, the downward air turbulence from propellers of the drone can also cause damages to some plants. The primary objective of the current invention is to provide a drone that can spray pesticide and other chemicals with high efficiency and precision and reduced drift over field crops. It is another objective of the present invention to provide a drone that can fly at a relative safe altitude but be able to spray at a height close to crop canopy. It is another objective of the present invention to provide a drone which can spray over a wide strip of crop field and therefore is efficient and cost effective in applying pesticide and other chemical agents for crop protection and production.

To achieve these objectives, the drone as in the present invention comprises an elongated frame comprising a long slender rigid beam structure and two base structures at the two ends of the beam, a cluster of propellers on motors with rotatable arms mounted to each of the two base structures of the frame, a rigid tube with an array of nozzles suspended below the beam structure with retractable wires, and the nozzles may have long stems extending from the rigid tube.

The drone further comprises a power source which may include a rechargeable battery or a combination of a generator and a rechargeable battery, a computer system with a processor and a data storage for controlling the movement and operations of the drone, a remote controller, an antenna for sending and receiving communication signals to and from the remote controller, a receiver for signals from navigation satellites such as GPS (Geographic Positioning Satellites) to track locations of the drone, two distance sensors on the two bases at the two ends of the beam frame for maintaining a certain height of the drone in the air, and a camera for recording photographs and videos.

Furthermore the drone has a front end propeller motor and a rear end propeller motor and their arms are oriented horizontally aligned with the longitudinal axis of the frame and has at least one pair of propeller motors on two sides of the drone with arms oriented horizontally and perpendicular to the longitudinal axis of the frame at the two sides of both the front and the rear base structures. Furthermore, the arms are rotatable and controlled by motors.

Furthermore the drone comprises a container for a chemical solution to be sprayed, an air pump connected to the top of the container to maintain positive pressures in the container, an electronic valve for releasing the chemical solution through a tube in the container and a transfer line to be sprayed from the nozzles. The container has an opening with a cap for refilling.

Furthermore the drone comprises a motorized reel for releasing and retracting the wires connecting to the rigid tube to position the tube with nozzles at different distance from the beam structure.

The drone may further comprises two distance sensors such as ultrasound sensors or laser sensors pointed downward to the ground from the two base structures of the frame for measuring heights of the drone above the ground.

The present invention can have a variety of additional embodiments such as different locations and types of the motor and the power source as well as different structures of frames without deviating from the basic structure of a long beam at the middle and two base structures at the two end to house other components of the drone and the retractable mechanism to suspend nozzles at different heights from the beam structure of the drone.

The present invention has several advantages. The long array of nozzles on the rigid tube below the long beam is able to spray over a wide strip of crop field. The release and retraction mechanism for the rigid tube with nozzles enables the drone to stay at a relatively safer altitude above ground but be able to spray pesticide or other chemicals close to crop canopy and thereby reduce pesticide drift and achieve high precision and also reduces the risk of damage to crop by the air turbulence. The long stems of the nozzles will enable the drone to spray pesticide close to crop canopy without the risk of entanglement of the tube with tall plants or sprinklers in the field.

Furthermore, the described features and specifications may be combined in any suitable manner in one or more embodiments. Furthermore, the drone of the present invention can be used to spray other liquid materials in addition to pesticides, fungicides, herbicides, plant growth regulators, defoliation agents, and fertilizers. The drone of the present invention can also be adopted for other purposes. One skilled in the relevant art will recognize that the invention can be practiced without one or more of the specific features or advantages of a particular embodiment.

BRIEF DESCRIPTION OF THE DRAWINGS

FIG. 7 is a prospective view of the remote controller of the preferred embodiment of the present invention.

DETAILED DESCRIPTION

Figure 1:
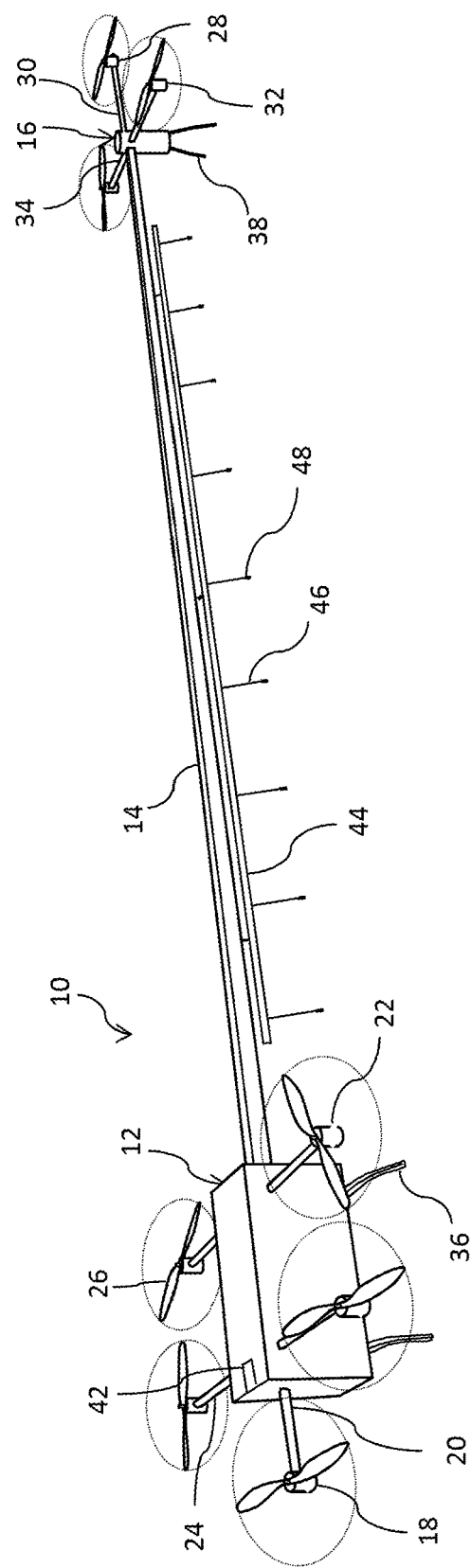
FIG. 1 is a perspective view of a preferred embodiment of the present invention showing a rigid tube with spray nozzles retracted.

With reference to FIG. 1 for a prospective of an preferred embodiment 10, the drone of the current invention comprises a frame with a rigid light beam structure 14 in the middle and a front base structure 12 and a rear base structure 16 at the two ends of the beam structure 14, an antenna 42 for sending and receiving communication signals, a front motor 18 on an arm 20, two pairs of side motors 22 on side arms 24 on the front base 12, a rear motor 28 on an arm 30 and a pair of side motors 32 on side arms 34 on the rear base 16, a propeller 26 on each of the motors 18, 22, 28, and 32, a rigid tube 44 has an array of sprouted stems 46 and nozzles 48 at the tips of the stems 46 and the rigid tube 44 is retractably suspended below the beam 14 and is at a retracted state next to the beam 14, landing gears 36 and 38 on the bottoms of the front base 12 and the rear base 16 respectively.

Figure 2:
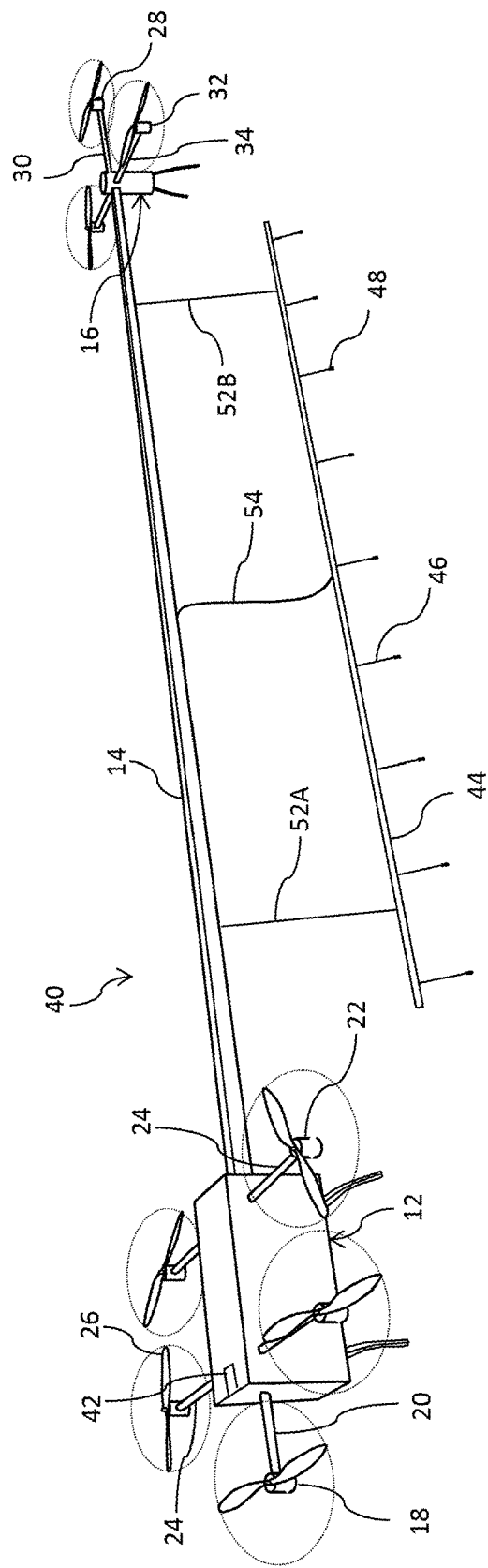
FIG. 2 is a perspective view of the preferred embodiment of the present invention showing the rigid tube with spray nozzles released and suspended at a distance below the beam structure of the frame.

With reference to FIG. 2 for an another prospective view 40 of the preferred embodiment, the rigid tube 44 is retractably suspended with two wires 52A and 52B from the beam 14 and is in a released status with some distance below the beam 14, a transfer line 54 extending from the beam 14 to the rigid tube 44 and the nozzles 48.

With references to FIGS. 1 and 2, the drone of the preferred embodiment 10, wherein the arms 20 and 30 for the front motor 18 and the rear motor 28 respectively are oriented horizontally along the axis of the beam 14 and the side arms 24 of the side motors 22 and the side arms 34 of the side motors 32 on the front base 12 and the rear base 16 respectively are oriented horizontally and are in perpendicular to the beam 14. Furthermore, all arms of propeller motors are rotatable.

Figure 3:
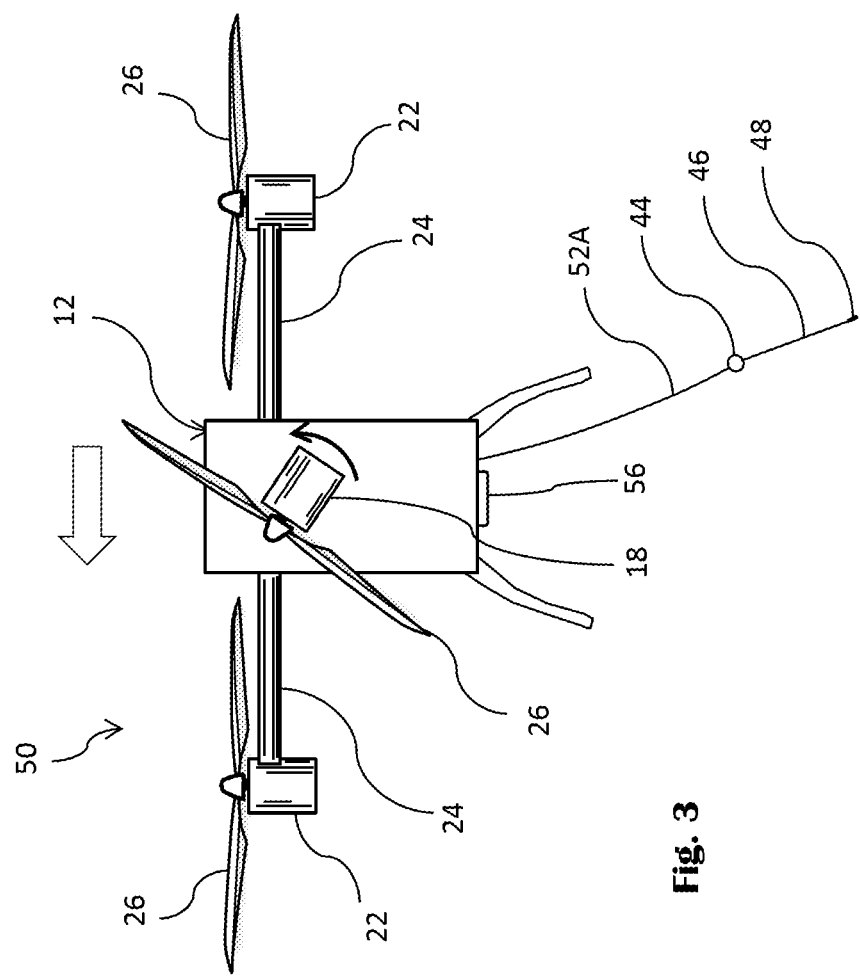
FIG. 3 is a front view of the preferred embodiment of the present invention showing the front motor with propeller tilted to propel the drone moving toward the side way.

FIG. 3 for a front view 50 of the preferred embodiment of the present invention shows the front motor 18 tilted counterclockwise to propel the drone flying sideway with the rigid tube 44 with the nozzle 48 on the stem 46 suspended in the air with wire 52A at a height below the front base 12, and a distance sensor 56 at the bottom of the front base 12.

Figure 4:
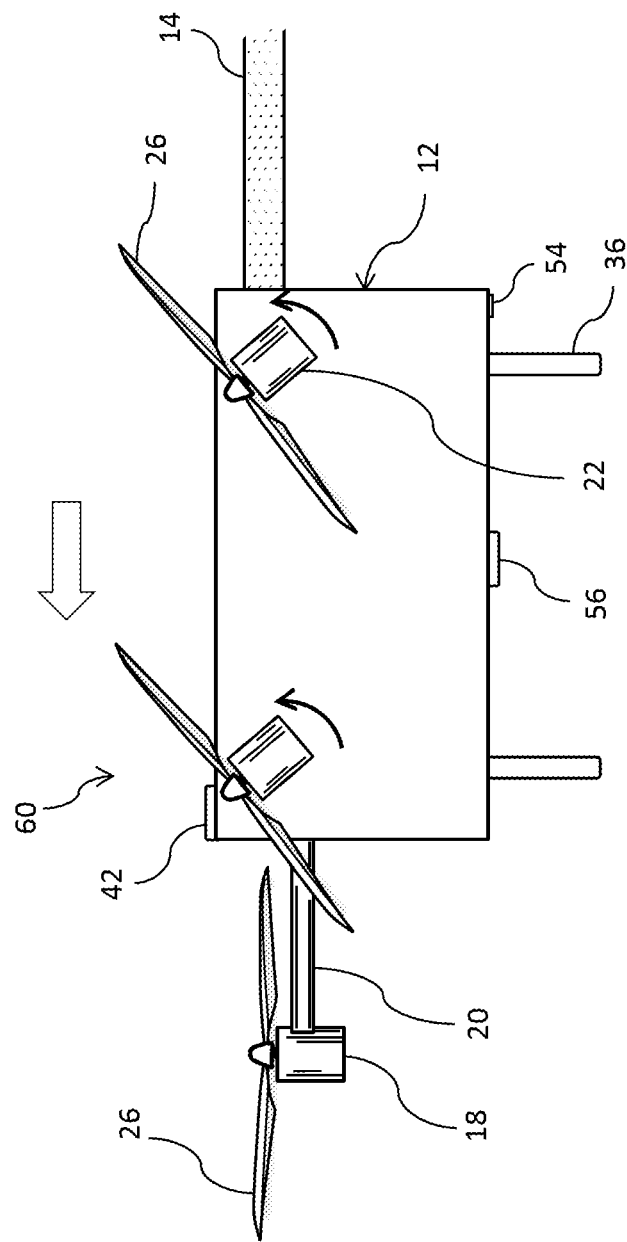
FIG. 4 is a side view of the front base of the preferred embodiment of the present invention showing the side motors with propellers tilted to propel the drone moving forward.

FIG. 4 for a side view 60 of the front base 12 of the preferred embodiment of the current invention shows counterclockwise tilting of the motors 22 on the side of the front base 12 to propel the drone moving forward, the distance sensor 56, a camera 54, and the landing gear 36.

Figure 5:
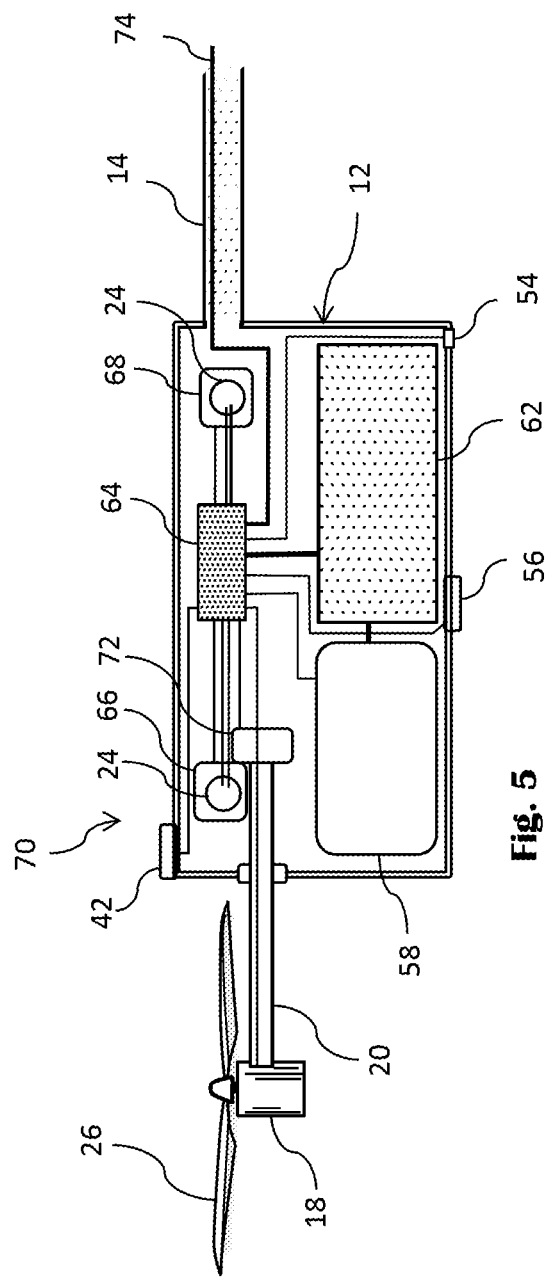
FIG. 5 is a side view of the front base of the preferred embodiment of the present invention showing interconnections of components in the front base structure of the drone.

With reference to FIG. 5 for a side view 70 of components of the front base 12, the rotatable arm 20 of the front motor 18 is operated by the motor 72. A generator 58 provides power to a rechargeable battery 62. A computer system 64 controls the generator 58, motors 66, 72, 68, a distance sensor 56, and a camera 54. A cable cluster 74 provides connections between the computer system 64 and components housed in the rear base for power distribution and communication. The motors 66 and 68 operate rotatable arms 24. An antenna 42 is on the base 12 and linked to the computer system 64.

Figure 6:
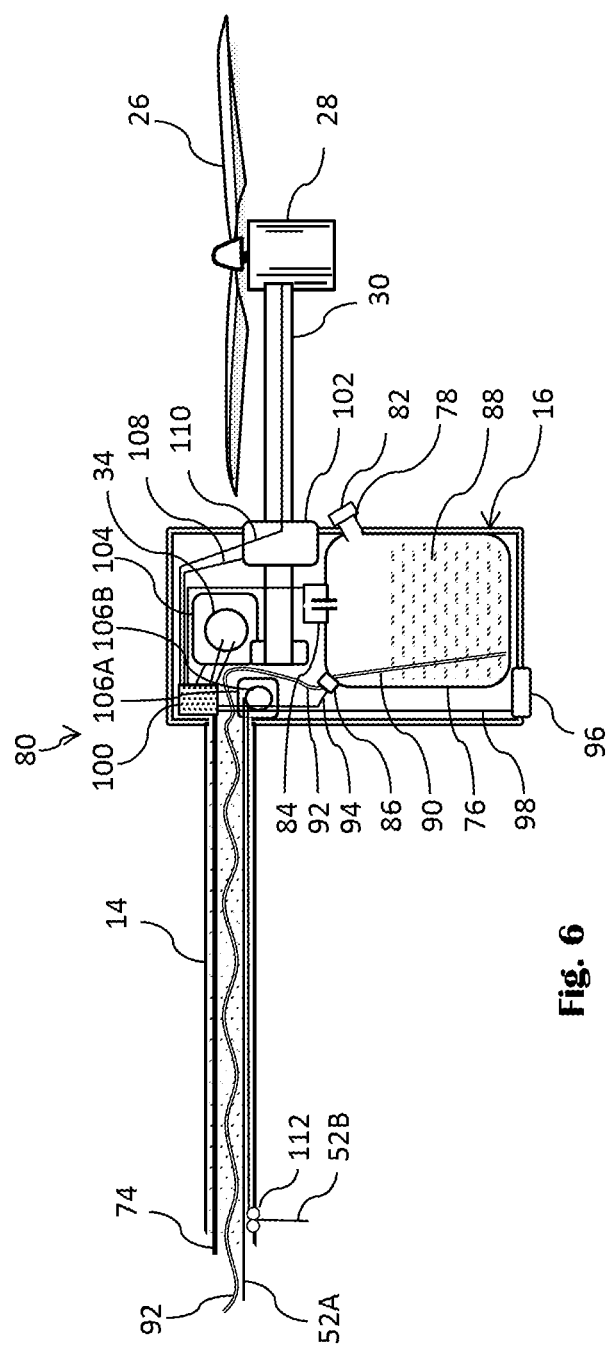
FIG. 6 is a side view of the rear base of the preferred embodiment of the present invention showing interconnections of components in the rear base structure of the drone.

With reference to FIG. 6 for a side view 80 of components in the rear base 16 of the preferred embodiment, the drone further comprises a container 76 for a liquid material 88, an element 100 to distribute power and control signals from the cable cluster 74, a distance sensor 96 for measuring the height of the drone, and a motor 104 to control the turning of the rotatable arm 34 of the side propeller motors 32 as in FIGS. 1 and 2. The container 76 has an opening 78 with a cap 82 and has an air pump 84 at top to maintain positive pressure in the container 76. The container 76 is also connected to an electric valve 86 and the valve 86 controls flow of the liquid material 88 through a tube 90 and the transfer line 92. The drone further comprises a motor 102 to turn the rotatable arm 30 of the motor 28 and a motor 104 to turn the rotatable arm 34 of the motor 32 as in FIGS. 1 and 2. The drone as in the FIG. 6 further comprises a motor 106A to turn a reel 106B to pull or release the suspension wires 52A and 52B to control the position of the rigid tube 44 as in FIGS. 1 and 2. As showing in FIG. 6, the beam 14 has a pair of pulley rolls 112 to allow the wire 52B to pass through so the rigid tube 44 as in FIGS. 1 and 2 can be released or retracted from the beam 14 by turning the reel 106B at different directions.

With reference to FIG. 7, the drone of the present invention further comprises a remote controller 120 and the remote controller 120 comprises a screen 122 and a base 114 with a pair of joysticks 116A and 116B and a plurality of number of control keys 118A, 118B, and 118C for power on/off, return to home base, and sprayer on/off functions.

The invention claimed is:

1. A drone for agriculture comprises: a frame with a slender beam structure in a middle, a front base structure at front end of the beam structure, and a rear base structure at rear end of the beam structure, a cluster of at least three motors with propellers on each of the front and rear base structures of the frame, a tubing element with an array of dispensing elements being suspended below the beam structure of the frame retractably with wires, a distance sensor for detecting a height of the drone, a power source, an antenna for sending and receiving communication signals, and a container.

2. The drone as in the claim 1, wherein the two clusters of motors with propellers on the front and rear base structures of the frame are mounted to the front base and the rear base rotatably through rotatable arms, and at least one of the rotatable arms on the front base and one of the rotatable arms on the rear base are oriented horizontally along a longitudinal axis of the beam structure, and at least one pair of the propeller motors of the said cluster of motors on the front base and one pair of the propeller motors of the said cluster of motors on the rear base are positioned on two sides of the longitudinal axis of the drone and have rotatable arms oriented horizontally and in perpendicular to the longitudinal axis.

3. The drone as in the claim 1, wherein the tubing element has an array of elongated stems sprouted from the tubing element and the array of dispensing elements are positioned at tips of the elongated stems.

4. The drone as in the claim 1, wherein the dispensing elements are nozzles.

5. The drone as in the claim 1, wherein the power source comprises a rechargeable battery.

6. The drone as in the claim 1, wherein the power source comprises a generator and a rechargeable battery.

7. The drone as in the claim 1 further comprises an onboard computer system with functions of storing and processing data and signals, operating sensors, control power supplies to all electronic components, a camera for taking photographs and videos, a module for receiving signals from a geographical positioning or navigation satellite, and a remote controller.

8. The drone as in the claim 1 further comprises an air pump connected to the said container to maintain a positive pressure in the container, an electric valve on the container to control flow of a liquid material from the container through a transfer line and the tubing to the dispensing elements.

9. A drone for agriculture comprises: (a) a frame with a slender rigid beam in a middle and two base structures at two ends, (b) at least three motors with propellers rotatably mounted to each of the two base structures of the frame, (c) a tubing element with an array of nozzles suspended below the said beam with retractable wires, (d) a power source positioned in one of the base structures, (e) a remote controller, (f) at least one distance detector for measuring a height of the drone above a ground, (g) an antenna for sending and receiving communication signals, (h) a computer system to control movements of the drone and communication with the remote controller, (i) a container for a liquid material with a caped opening for refilling and an air pump to maintain a positive pressure in the container and electronic valve to allow the liquid material in the container under pressure to be released through a transfer line to be sprayed from the nozzles.

* * * * *